US007787894B2

(12) United States Patent
Simon et al.

(10) Patent No.: US 7,787,894 B2
(45) Date of Patent: *Aug. 31, 2010

(54) METHOD AND SYSTEM TO FACILITATE INTERACTION BETWEEN AND CONTENT DELIVERY TO USERS OF A WIRELESS COMMUNICATIONS NETWORK

(75) Inventors: Daniel Simon, San Diego, CA (US); Mark Ford Westling, Chevy Chase, MD (US); Phillip Wherry, Vienna, VA (US)

(73) Assignee: Cricket Communications, Inc., San Diego, CA (US)

( * ) Notice: Subject to any disclaimer, the term of this patent is extended or adjusted under 35 U.S.C. 154(b) by 537 days.

This patent is subject to a terminal disclaimer.

(21) Appl. No.: 11/400,783

(22) Filed: Apr. 7, 2006

(65) Prior Publication Data

US 2007/0099701 A1 May 3, 2007

(51) Int. Cl.
*H04W 4/00* (2009.01)
*H04B 7/00* (2006.01)
(52) U.S. Cl. .................. 455/466; 455/517; 455/519
(58) Field of Classification Search .......... 463/39, 463/40, 41, 42; 455/466, 456.1, 414.1, 412.1, 455/500, 517–519, 418–420; 725/46, 2, 725/62, 105; 370/312

See application file for complete search history.

(56) References Cited

U.S. PATENT DOCUMENTS

| 5,618,045 | A | * | 4/1997 | Kagan et al. ................. 463/40 |
| 6,205,205 | B1 | * | 3/2001 | Goldberg et al. ........... 379/67.1 |
| 6,314,301 | B1 | * | 11/2001 | Dorenbosch et al. ........ 455/519 |
| 6,377,793 | B1 | * | 4/2002 | Jenkins ..................... 455/412.1 |
| 6,524,189 | B1 | * | 2/2003 | Rautila ........................ 463/40 |
| 6,527,641 | B1 | * | 3/2003 | Sinclair et al. ................ 463/39 |
| 6,554,707 | B1 | * | 4/2003 | Sinclair et al. ................ 463/39 |
| 6,628,302 | B2 | * | 9/2003 | White et al. ................. 715/717 |
| 6,647,257 | B2 | * | 11/2003 | Owensby ................. 455/414.1 |
| 6,702,672 | B1 | * | 3/2004 | Angell et al. ................. 463/25 |
| 6,712,702 | B2 | * | 3/2004 | Goldberg et al. ............. 463/42 |
| 6,893,347 | B1 | * | 5/2005 | Zilliacus et al. .............. 463/41 |
| 6,993,325 | B1 | * | 1/2006 | Waesterlid ............... 455/414.1 |
| 7,035,653 | B2 | * | 4/2006 | Simon et al. ................ 455/466 |
| 7,284,202 | B1 | * | 10/2007 | Zenith ........................ 715/744 |

* cited by examiner

*Primary Examiner*—George Eng
*Assistant Examiner*—Brandon J Miller
(74) *Attorney, Agent, or Firm*—Perkins Coie LLP (57) ABSTRACT

A system and method of creating affinity groups of portable communication device users, and distributing targeted content to said users is disclosed. The user affinity groups may be formed by comparing user profiles with each other or with a predefined affinity group profile definition.

74 Claims, 5 Drawing Sheets

METHOD AND SYSTEM TO FACILITATE INTERACTION BETWEEN AND CONTENT DELIVERY TO USERS OF A WIRELESS COMMUNICATIONS NETWORK

This application claims the benefit of U.S. application Ser. No. 09/833,656, filed Apr. 13, 2001, entitled "METHOD AND SYSTEM TO FACILITATE INTERACTION BETWEEN AND CONTENT DELIVERY TO USERS OF A WIRELESS COMMUNICATIONS NETWORK".

FIELD OF THE INVENTION

The present invention relates to an improved method and system for facilitating interaction between users of a wireless communications network based on users' affinity (i.e. similar or matching user characteristics or interests). Determination of user affinity groups may be made by comparison of user profiles. Embodiments of the present invention may have particular application to the provision of entertainment services, such as gaming, over a wireless communications network.

BACKGROUND OF THE INVENTION

During television coverage of the Sydney 2000 Olympics, in September of 2000, NBC ran an advertisement for Lucent featuring two businessmen, located in different countries getting into the back seats of vehicles and playing an interactive racing game against each other over a wireless telecommunications network. It was implied in the commercial that data reflecting each player's racing maneuvers was being sent to each player's handheld device in real-time. As the game action progressed, both businessmen were beaten by an unknown third player: "Red Falcon." The shot then shifted to two young girls standing on a sidewalk somewhere in Asia, celebrating their victory as Red Falcon. The two men then looked quizzically at their respective screens and, in their respective languages, say: "Who is Red Falcon?"

The advertisement depicted a real-time, live-action, multi-player game featuring high-resolution, color graphics. It was implied by the commercial that the system in which all of the players were operating was capable of providing a steady stream of game data (content) that enabled the players to perceive that the game action was uninterrupted. Although the scenario was fictional, it is still instructive of desirable aspects of an interactive wireless communications system having content provision capabilities. As is evident from the commercial, it would be desirable to have a system that provides real-time interaction with other portable communications device users who have like interests, such as racing games. It would also be desirable for the gentlemen who were beaten by Red Falcon to have been included in a game with players of a like (and apparently lower) skill level. Both of these desirable features are met by the various embodiments of the present invention.

The Applicants are not aware of any systems that currently offer users with like interests real-time, live-action, interactive services, such as gaming, with high graphic resolution, over a wireless communications network. The closest thing to such a system that Applicants are aware of is disclosed in published European Patent Application No. 00660125.6, Publication No. EP 1 066 868 A2 (Published: Jan. 10, 2001; Filed Jul. 5, 2000), entitled "Multi-player Game System Using Mobile Telephone and Game Unit," and assigned to Nokia Corporation.

State of the art wireless entertainment is further exemplified by Nintendo Corporation's recent announcement that it will be releasing a wireless-enabled Game Boy brand device, under the name AGame Boy Advance.@ Nintendo has announced that it will form a joint venture, Mobile 21, with Konami to develop software for the new game player. The Game Boy Advance device reportedly will use a 32-bit RISC CPU developed by Cambridge, UK based ARM corporation, a well-known developer of CPUs for cellular phones. In addition, the Game Boy Advance device reportedly will be able to connect to a cellular phone (or a PHS phone in Japan) to access the Internet, thus allowing users to download game software, participate in multi-player games, chat, and exchange E-mail. Use of a planned digital camera accessory would enable the user to see the face of the person they are playing against.

Nintendo has also announced that it intends to add a communications feature to the Game Boy game system, making the Game Boy Advance system a personal communications terminal, as well as a gaming system. The company reports specifically that it intends to enable multi-player gaming. The present inventors believe that the foregoing described Game Boy Advance system exemplifies the type of system that will benefit from the present invention.

The Assignee of the present application has made significant advances in the "real-time" and "live-action" interactive aspects of such an overall system, which are described in co-pending U.S. Provisional Patent Application Ser. No. 60/252,468, filed Nov. 22, 2000, entitled "Method and System for Providing Interactive Services Over a Wireless Communications Network"; U.S. Provisional patent application filed Apr. 13, 2001, entitled "Method and System for Mediating Interactive Services Over a Wireless Communications Network"; and U.S. Provisional Patent application filed Apr. 13, 2001, entitled "Method and System for Improving the Efficiency of State Information Transfer Over a Wireless Communications Network," each of which is incorporated by reference herein.

The focus of the present application, however, is on the creation and maintenance of affinity groups of portable communications device users and the transmission of selected content to these users based on their membership in the affinity groups. These affinity groups may group users on the basis of their having like characteristics or interests, or potentially on the basis of their having dissimilar characteristics or interests. Alternatively, users may "self-select" themselves for inclusion in an affinity group. Such an affinity group may have benefited the gentlemen discussed above, who were beaten by Red Falcon, by grouping them with other racing game aficionados of like skill level, age, experience, etc.

While the existence of such affinity groups will certainly facilitate gaming applications such as the one described above, it is evident that the usefulness of such groups extends well beyond the wireless gaming world and is applicable to any system in which content can be targeted to a group of portable communications device users. Thus, although the use of affinity groups is discussed herein using a gaming example, it is appreciated that such groups may be used in many other applications such as in the provision of information or applications (referred to collectively as "content") relating to news, sports, finances, job listings, goods, services, advertisements, social networking, gaming, lifestyle, etc.

The need for an effective method and system for identifying and maintaining affinity groups is evident from the planned release of systems such as the Game Boy Advance system. In a May 1999 report, Fairfield Research estimated that ten (10) million U.S. households currently play games online. Moreover, Fairfield estimates that gamers have increased their playing time by twenty percent (20%) in the past year and will increase it by another seventeen percent (17%) in the coming year. Eighty percent (80%) of respondents expressed interest in downloading additional game levels and options from the Internet. Sixty-six percent (66%) of online gaming time is spent playing other gamers. Although wireless interactive game technology is in its infancy, the subscriber demand is understood to be enormous. Based upon Game Boy sales alone, which are over one hundred (100) million, the demand for interactive entertainment services is substantial and is expected to remain robust. The present inventors estimate that the market for such services may exceed five (5) billion dollars within the next five to ten years.

Looking beyond the gaming example for the moment, there are many uses for affinity groups. They may be used to:

facilitate communication between and content delivery to users who have selected themselves to receive the certain information, whether it be news, sports, game initiation and invitation notices, game applications, personal messages, advertisements, sales offers, etc.;

facilitate communication between and content delivery to users with the same interests or preferences as indicated by a user profile, whether it be sports, games, travel, etc. interests;

facilitate communication between and content delivery to users with the same capabilities, whether they be physical or mental;

facilitate communication between and content delivery to users with the same or compatible wireless communications devices (e.g. telephones);

facilitate communication between and content delivery to users having like, or purposefully dissimilar, demographics (such as geographic location, income, education, family structure, age, ethnicity, religion, sex, etc.); and facilitate communication between work groups for collaborative purposes.

Affinity groups may be created primarily as the result of compiling user profile information. An exemplary profile engine for the collection and maintenance of user profiles, and which may be used to carry out the various embodiments of the present invention, is described in co-pending U.S. patent application Ser. No. 09/213,387 filed Dec. 10, 1998, entitled "System and Method for Providing Targeted Messages Based on Wireless Mobile Location," which is assigned to the Assignee of the present application and which is incorporated by reference herein. Other exemplary profile engines (which are not intended to be limiting) for the collection, maintenance, and/or use of user profiles, and which may be used to carry out the various embodiments of the present invention, are described in U.S. Pat. No. 6,108,645 (Aug. 22, 2000) to Eichstadt et al., U.S. Pat. No. 5,995,943 (Nov. 30, 1999) to Bull et al., U.S. Pat. No. 6,134,532 (Oct. 17, 2000) to Lazarus et al., U.S. Pat. No. 5,828,843 (Oct. 27, 1998) to Grimm et al., U.S. Pat. No. 6,023,729 (Feb. 8, 2000) to Samuel et al., U.S. Pat. No. 6,024,643 (Feb. 15, 2000) to Begis, and U.S. Pat. No. 6,128,660 (Oct. 3, 2000) to Grimm et al., each of which is incorporated by reference herein.

User profiles, like users, are subject to change over time. Accordingly, Applicants have determined that there is a need for a system that not only uses user profiles to provide affinity groups, but is also capable of creating and revising such profiles, and thus groups, (preferably in real-time) on an on-going basis. This need arises from the constant change in the users who subscribe to such an affinity group system on a long term basis, the ever changing users who are presently "live" on the network, users' updating of their own profiles, and profile updates that result from the systems collection of data about users.

The system's ability to collect data relating to users' recent actions (e.g. buying patterns, shopping patterns, eating patterns, location patterns, travel patterns, communication patterns, game statistics, etc.) provides the system with heuristic capabilities (i.e. the ability to learn and predict user behaviors). The heuristic capabilities of the system may be used to anticipate the behavior of individuals in an affinity group and/or group behaviors. To this end, embodiments of the present invention may record, on an on-going basis, which users subscribe to an affinity group service, which users are live on the system, which users have updated profile information, and what, where, and when has a user bought, shopped, ate, stayed, traveled, won, lost, or played a game, etc.

Applicants have also determined that various embodiments of the present invention may benefit from the inclusion of a means for identifying the location of the user and adapting services rendered to the user and the affinity groups to which the user may be joined based on the user's location. Examples of wireless communications systems including means for identifying the location of a handheld device (primarily through use of GPS) are legion in the art. Applicants incorporate by reference herein the following co-pending applications, which are assigned to the Assignee of the present invention, and which disclose location determination systems for use with wireless telephones: U.S. patent application Ser. No. 09/768,305, filed Jan. 25, 2001, entitled "Knowledge-Based Information Retrieval System and Method for Wireless Communication Device," and U.S. patent application Ser. No. 09/384,686, filed Aug. 27, 1999, entitled "Location-Based Information Retrieval System for Wireless Communication Device."

Applicants note that the inclusion of a user in an affinity group may also result from the initiative of a user notwithstanding the lack of an indication in their profile that the group would be of interest to them. That is, even if a user's profile would not normally result in the selection by the system of that user for a particular affinity group, the user may override the system and join or become part of an affinity group anyway.

The present invention addresses the problem of how to create and manage an interactive community cost effectively. In particular, the present invention offers an interactive experience, in which the action and content delivery may be initiated and maintained between affinity groups of users of like characteristics, interests and/or capabilities. Embodiments of the present invention may be used to improve definition and management of these affinity groups. This may enable a wireless communications operator to provide a higher quality interactive experience with the same investment of network resources. This also may make it possible for an operator to provide a wireless game service to end users at a flat monthly rate rather than on a per unit of time consumed basis. In this regard, the pricing model of Assignee=s Cricket wireless telecommunications services may preferably be adopted.

OBJECTS OF THE INVENTION

It is therefore an object of the present invention to provide a method and system for fostering an interactive community of portable communications device users.

It is another object of the present invention to provide a method and system for creating and maintaining affinity groups of portable communications device users.

It is still another object of the present invention to provide a method and system for providing affinity groups to facilitate a wide range of user interactions and content provision thereto, including but not limited to, news reporting, sports reporting, stock market reporting, gaming, personal networking, advertising, buying, selling, etc.

It is yet another object of the present invention to provide a method and system for grouping, matching, and facilitating interaction between, and content provision to, portable communications device users having selected (like or dislike) physical and/or mental capabilities and skill levels.

It is yet another object of the present invention to provide a method and system for grouping, matching, and facilitating interaction between, and content provision to, portable communications device users having like communications equipment.

It is yet another object of the present invention to provide a method and system for grouping, matching, and facilitating interaction between, and content provision to, portable communications device users having like interests.

It is yet another object of the present invention to provide a method and system for grouping, matching, and facilitating interaction between, and content provision to, portable communications device users having selected (like or dislike) demographics.

It is yet another object of the present invention to provide a method and system for creating and maintaining affinity groups that establishes and updates user profiles.

It is yet another object of the present invention to provide a method and system for creating and maintaining affinity groups that has heuristic capabilities.

It is yet another object of the present invention to provide a method and system for creating and maintaining affinity groups that utilizes user location information.

It is still yet another object of the present invention to provide a method and system for creating an even playing field for portable communications device users participating in interactive gaming services.

It is yet another object of the present invention to provide a more cost effective method and system for delivering interactive services to portable communications device users.

Additional objects and advantages of the invention are set forth, in part, in the description which follows and, in part, will be obvious from the description or may be learned by practice of the invention.

BRIEF SUMMARY OF THE INVENTION

The present invention is directed to a system to facilitate interaction between, and content delivery to, users of a wireless communications network.

In response to the foregoing challenges, Applicants have developed an innovative system for creating an affinity group of portable communications device users comprising a means for providing wireless communication between the users, a means for storing profile data relating to each of the users, the means for storing being operatively connected to the means for providing wireless communications, and a means for (a) comparing the profile data of different ones of said users, and (b) associating users with the affinity group based on the profile data comparison to thereby create the group, said means for comparing and associating being operatively connected to the means for storing.

Applicants have also developed an innovative system for creating an affinity group of portable communications device users comprising means for providing wireless communication between the users, a means for storing profile data relating to each of the users, a means for storing being operatively connected to the means for providing wireless communications, and a means for (a) comparing the profile data of each of said users with a predefined affinity group definition, and (b) associating users with the affinity group based on the comparison user profile data with the predefined affinity group definition to thereby create the group, said means for comparing and associating being operatively connected to the means for storing.

Applicants have also developed an innovative method of creating an affinity group of portable communications device users comprising the steps of providing wireless communication between the users, receiving profile data relating to each of the users, storing the profile data relating to each of said users, comparing the stored profile data of different ones of the users, and associating users with the affinity group based on the profile data comparison.

Applicants have also developed an innovative method of creating an affinity group of portable communications device users comprising the steps of providing wireless communication between the users, receiving profile data relating to each of the users, storing the profile data relating to each of the users, comparing the profile data of a plurality of the users with a predefined affinity group definition, and associating users with the affinity group based on the comparison of the user profile data with the predefined affinity group definition to thereby create the group.

Applicants have also developed an innovative method of creating an affinity group of wireless telephone users in real-time comprising the steps of providing wireless telephone communication between the users, accessing profile data relating to selected ones of the users comparing the accessed profile data of different ones of the users, and associating users with the affinity group based on the profile data comparison.

Applicants have also developed an innovative method of creating an affinity group of wireless telephone users in real-time comprising the steps of providing wireless telephone communication between the users, accessing profile data relating to selected ones of the users, comparing the accessed profile data with a predefined affinity-group definition, and associating users with the affinity group based on the comparison of the profile data with the predefined affinity group definition.

Applicants have also developed an innovative method of maintaining a group of portable communications device users associated with an affinity group based on comparisons of stored user profile data, the method comprising the steps of receiving updated profile data relating to users, modifying the stored user profile data based on the received updated profile data, comparing the modified user profile data of different ones of the users, and modifying as needed the users associated with the affinity group based on the modified user profile comparison.

Applicants have also developed an innovative method of maintaining a group of portable communications device users associated with an affinity group based on comparisons of stored user profile data, the method comprising the steps of receiving updated profile data relating to users, modifying the stored user profile data based on the received updated profile data, comparing the modified user profile data to a predefined affinity group definition, and modifying as needed the users associated with the affinity group based on the comparison of the modified user profile data with the predefined affinity group definition.

Applicants have also developed an innovative system for distributing content to an affinity group of portable communications device users comprising a means for providing portable communications device communication between the users, a means for storing profile data relating to each of the users, the means for storing being operatively connected to the means for providing communication, a means for (a) comparing the profile data of different ones of the users, and (b) associating users with the affinity group based on the profile data comparison to thereby create the group, the means for comparing and associating being operatively connected to the means for storing, and a means for selecting content for and distributing content to the users based on their inclusion in an affinity group, the means for selecting and distributing being operatively connected to the means for providing communication and the means for comparing and associating.

Applicants have also developed an innovative system for distributing content to an affinity group of portable communications device users comprising a means for providing communication between the users, a means for storing profile data relating to each of the users, the means for storing being operatively connected to the means for providing communication, a means for (a) comparing the profile data of each of said users with a predefined affinity group definition, and (b) associating users with the affinity group based on the comparison user profile data with the predefined affinity group definition to thereby create the group, the means for comparing and associating being operatively connected to the means for storing, and a means for selecting content for and distributing content to the users based on their inclusion in an affinity group, the means for selecting and distributing being operatively connected to the means for providing communication and the means for comparing and associating.

Applicants have also developed an innovative method of distributing targeted content to an affinity group of portable communications device users comprising the steps of providing wireless communication between a plurality of users, receiving profile data relating to selected ones of the users, storing the profile data relating to the users, comparing the stored profile data of different ones of the users, associating users with the affinity group based on the profile data comparison, and distributing targeted content to the affinity group.

Applicants have also developed an innovative method of distributing targeted content to an affinity group of portable communications device users comprising the steps of providing wireless communication between a plurality of users, receiving profile data relating to selected ones of the users, storing the profile data relating to the users, comparing the profile data a plurality of the selected users with a predefined affinity group definition, associating users with the affinity group based on the comparison of the user profile data with the predefined affinity group definition to thereby create the group, and, distributing targeted content to the users in the affinity group.

It is to be understood that both the foregoing general description and the following detailed description are exemplary and explanatory only, and are not restrictive of the invention as claimed. The accompanying drawings, which are incorporated herein by reference, and constitute a part of the specification, illustrate certain embodiments of the invention, and together with the detailed description, serve to explain the principles of the present invention.

BRIEF DESCRIPTION OF THE DRAWINGS

The present invention will now be described in connection with the following figures in which like reference numbers refer to like elements and wherein.

DETAILED DESCRIPTION OF THE PREFERRED EMBODIMENTS

Figure 1:
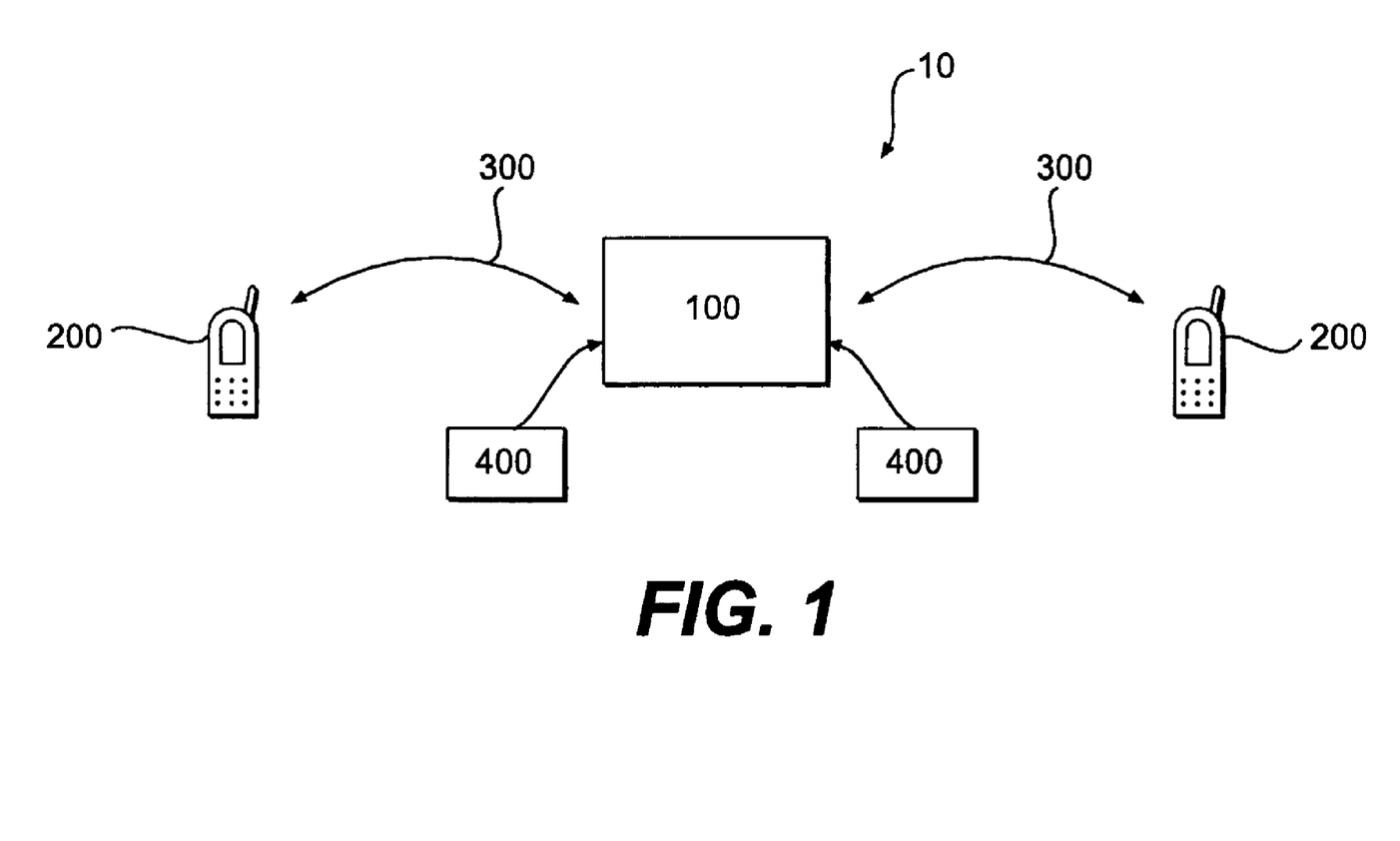
FIG. 1 is a schematic diagram of a telecommunications system in accordance with a first embodiment of the present invention.

Reference will now be made in detail to the system and method embodiments of the present invention, examples of which are illustrated in the accompanying drawings. A first embodiment of the present invention is shown in FIG. 1 as wireless communication system 10. The system 10 includes a centrally located content server 100 and a plurality of portable communications devices 200. Communication between the content server 100 and the portable communications devices 200 may be carried out by a wireless network 300. The components of the wireless network 300 that are required to facilitate two-way communication between a server, such as the content server 200, and the portable communications devices 200 are well known in the art, and accordingly, will not be discussed in detail here. The content server 100 has access to user profiles 400.

For the purposes of carrying out an embodiment of the invention, it is preferred that the content server have capabilities selected from the following list:

access stored user profiles;
 compare user profiles against each other to identify like or dislike interests, preferences, or characteristics;
 compare user profiles to predefined affinity group definitions to identify users who belong in the affinity group;
 create and associate users with affinity groups based on the user profile comparisons to each other and/or to the predefined affinity group definition;
 store affinity group membership and definition information;
 include self-selected users in affinity groups;
 modify and update user profiles;
 select local (e.g. that stored in a memory associated with the content selector) information for distribution to affinity group members;

select remote (e.g. that available from remote servers, such as Internet server) information for distribution to affinity group members; and select local and/or remote applications (particularly interactive gaming applications) for distribution to affinity group members.

The content selector 100 may have all typical computing components, such as a processor, memory, and input and output interfaces, which are well known in the art. Examples of systems that include components that may be readily adapted to perform the content selector functions of the present invention are disclosed in the various patents and patent applications discussed in the background section of this application, each of which is incorporated by reference herein.

In a preferred embodiment, which should not be taken as limiting, the portable communications devices 200 may be approximately 200 grams in weight including the battery and all required communications components. The portable communications devices 200 are pocket-sized units that are designed for convenient handheld use without the need for an awkward cabling connection. The portable communications devices 200 may withstand a three (3) meter drop without breakage. The viewing screen of the portable communications devices preferably has an area of greater than three (3) $in^2$, provides 256 colors, and is bright, reflective and clear. The user interface of the portable communications device 200 may include an 8-direction joystick and text input capability. With respect to audio features, the portable communications device 200 may include an MP3 Player, MPEG I and II support, standard MIDI support, a microphone, stereo speakers, and a headphone stereo mini-jack input.

Preferably, the portable communications device includes a 32 bit processor and is game predictive performance-capable to minimize high-latency impact. The portable communications device 200 may be provided with sufficient bits of RAM so as to be capable of storing at least five (5) games in addition to normal communications applications, and sufficient bits of ROM to provide adequate memory for custom configuration. The portable communications device 200 may also include memory back-up capabilities. The telephone device 200 battery should provide at least six (6) hours use time in communications mode and be rechargeable.

The portable communications device 200 preferably may be capable of communication using IS-95 A with packet data. The portable communications device 200 has the capability of being remotely provisioned by the network provider.

With continued reference to FIG. 1, the user profiles 400 may contain user profile data that is stored on a memory device. The user profile data may be organized using a user identifier. It is preferable for security and privacy reasons that the user identifier provide an anonymous identification of a user so that a breach of the memory on which the user profiles are stored cannot be used to obtain personal user information. The user profiles may contain any and all of the following information about the user:

credit card, and/or billing;

affinity group memberships, which may include but are not limited to game specific memberships and game genre memberships, etc.;

numeric or other rankings of interest in or preferences relating to news topics, sports, advertisements, goods, services, electronic games, interactive games;

portable communications device make, model, and capabilities;

game applications resident on the user's portable communications device;

skill level for each game a user participates in, including virtual reality games;

achievement level for each game a user participates in;

user's virtual reality character characteristics;

portable communications device usage level;

occupation;

income level;

education level;

residence or geographic area;

age;

sex;

religion;

frequent locations;

device characteristics; and/or identification of other users precluded from communicating with the user.

Figure 2:
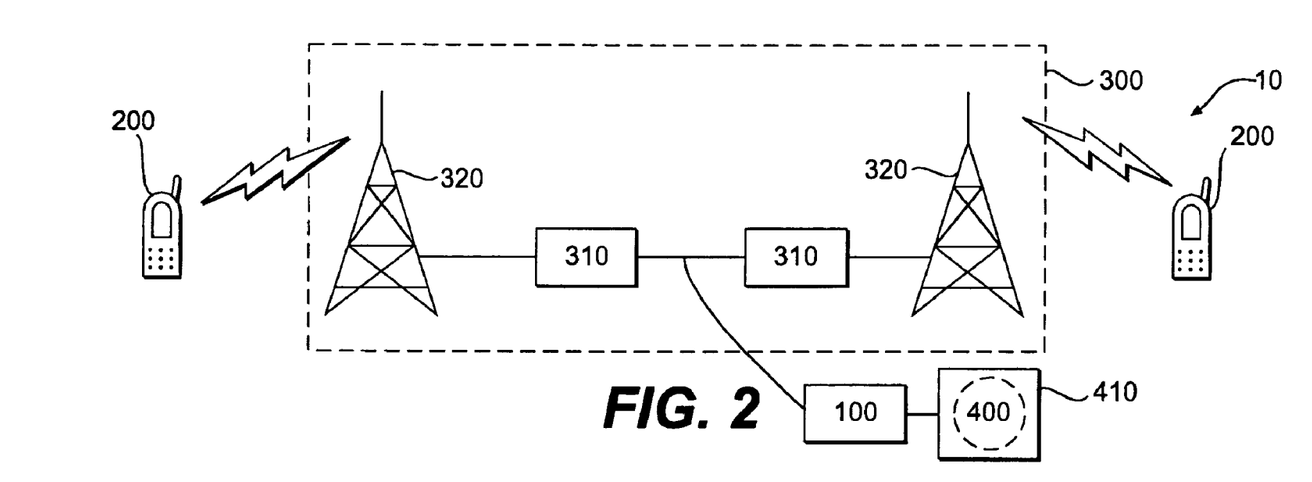
FIG. 2 is a more detailed schematic diagram of a telecommunications system in accordance with the first embodiment of the present invention.

With reference to FIG. 2, a more detailed illustration of system 10 configured in accordance with the first embodiment of the present invention is provided. In FIG. 2, a centrally located content selector 100 is operatively connected to one or more Mobile Switching Centers 310. Each Mobile Switching Center 310 may be operatively connected to one or more base stations 320. A wireless link connects the base stations 320 to the portable communications devices 200 located in the vicinity of the base stations. A user profile database 410, primarily comprising a memory device, is associated with and operatively connected to the content selector 100. All of the user profiles 400 may be centrally stored in the database 410.

Figure 3:
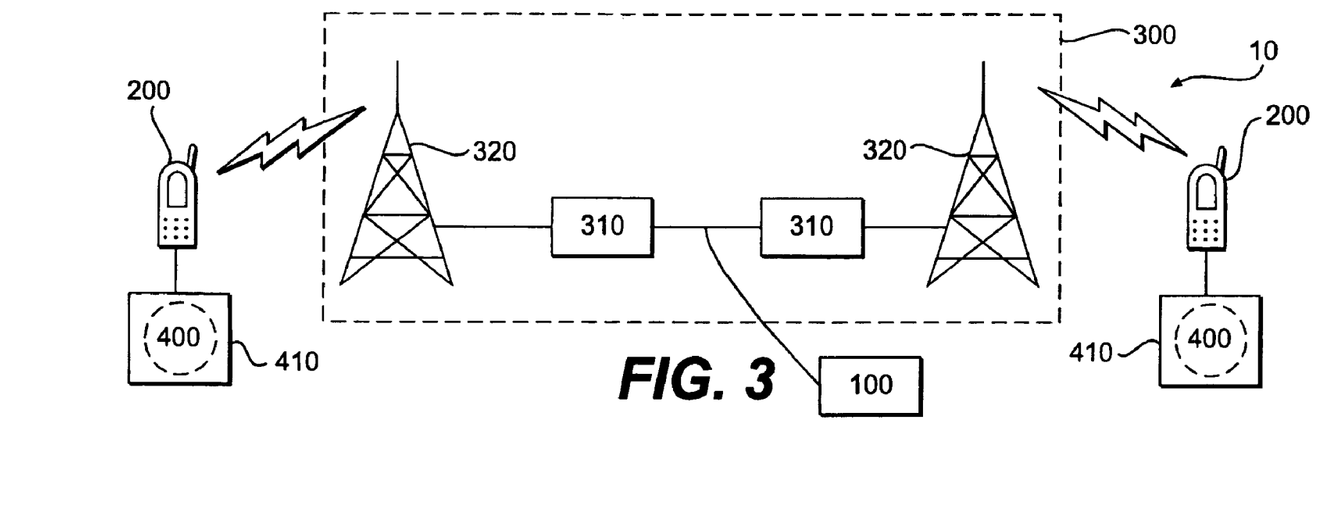
FIG. 3 is a schematic diagram of a telecommunications system in accordance with a second embodiment of the present invention.

With reference to FIG. 3, a detailed illustration of system 10 configured in accordance with a second embodiment of the present invention is provided. In FIG. 3, a centrally located content selector 100 is operatively connected to one or more Mobile Switching Centers 310. Each Mobile Switching Center 310 is operatively connected to one or more base stations 320. A wireless link connects the base stations 320 to the portable communications devices 200 located in the vicinity of the base stations. As distinguished from the system shown in FIG. 2, the database 410 is located in the portable communications devices 200, such that the user profile database is a distributed database. In this embodiment, the locally-resident profile database 410 may take an active role in requesting information from the central content server 100.

Figure 4:
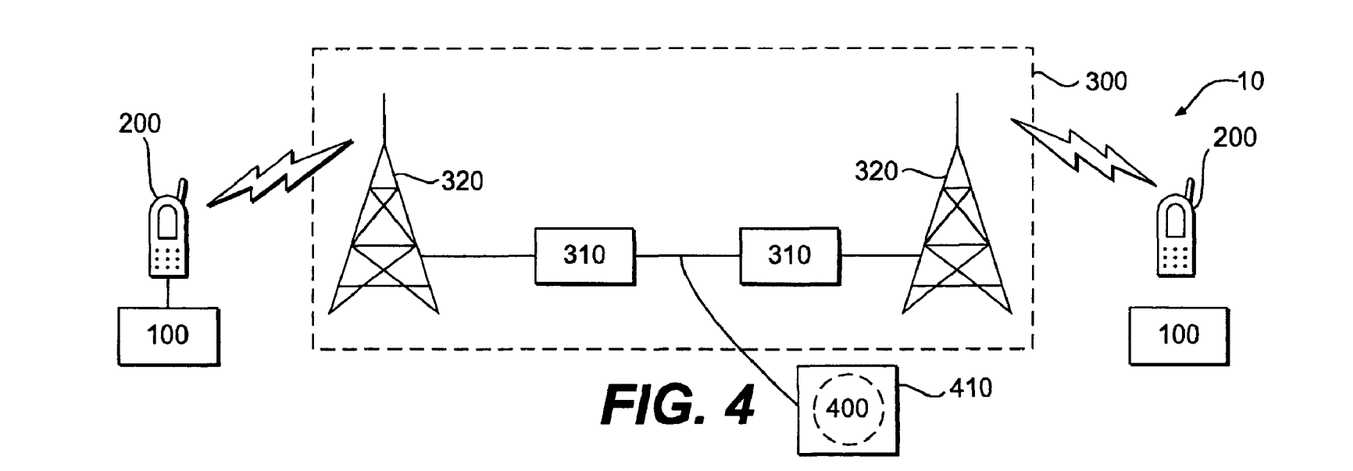
FIG. 4 is a schematic diagram of a telecommunications system in accordance with a third embodiment of the present invention.

With reference to FIG. 4, a detailed illustration of system 10 configured in accordance with a third embodiment of the present invention is provided. The components of the system shown in FIG. 4 operate the same as those shown in FIGS. 2 and 3. In the system 10 shown in FIG. 4, however, the content selector 100 is provided as a distributed application that is resident in each portable communications device 200. Although the content selector 100 is a distributed rather than a central application, its function remains the same.

Figure 5:
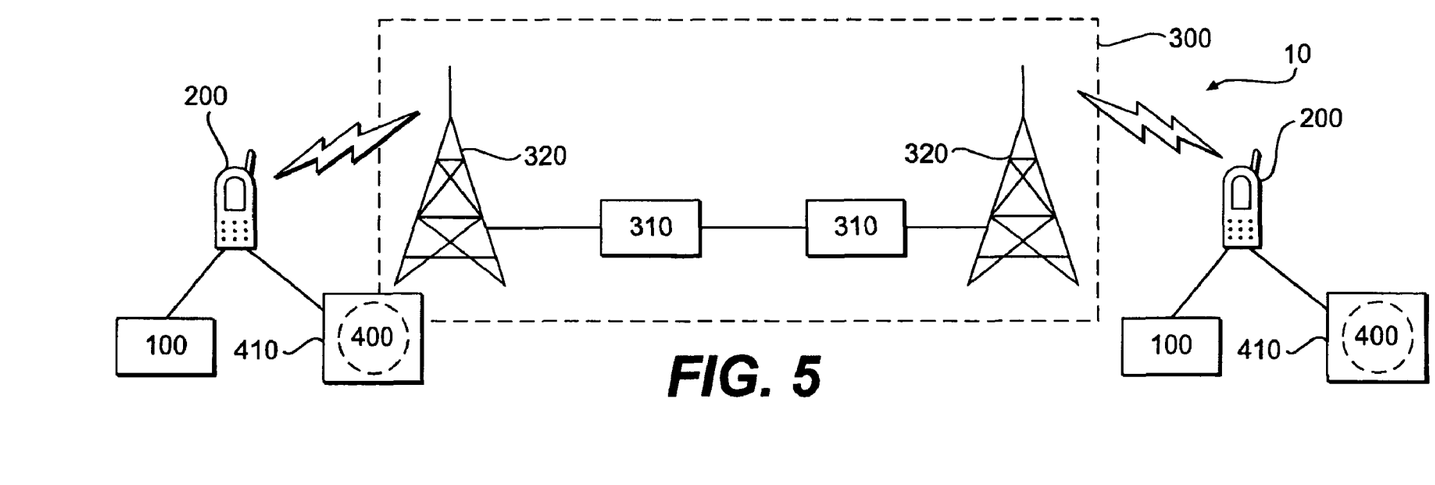
FIG. 5 is a schematic diagram of a telecommunications system in accordance with a fourth embodiment of the present invention.

With reference to FIG. 5, a detailed illustration of system 10 configured in accordance with a fourth embodiment of the present invention is provided. The components of the system shown in FIG. 5 operate the same as those shown in FIGS. 2-4. In the system 10 shown in FIG. 5, however, the content selector 100 and the profile database 400 are each provided as distributed applications/databases resident in each portable communications device 200.

As illustrated in the accompanying diagrams and recited in the accompanying claims, the various embodiments of the invention include methods and systems whereby an individual can self-identify, or through certain actions and behaviors be automatically identified by the system as a member of a particular affinity group, and receive various types of information, notifications, and other types of content that would be of appropriate interest to members of that group.

The method of providing content to affinity group members in accordance with a fifth embodiment of the invention is described with reference to FIG. 6. In accordance with known profiling techniques (disclosed in the references discussed in the background section of this application), the above-referenced profile data may be collected in written or electronic form from users in step 500. A user can create a profile for their interests and the types of information and notifications they wish to receive by entering their base profile information on a device with connectivity to the content server 100. Some aspects of the user profile, such as what services the user has paid for, or what type of device is used by the user to receive the information and notifications, is not subject to edit by the user but will be either automatically submitted to the content server via underlying software on the device, or can be edited by the manager of the content server and any utility applications they may deploy for that purpose.

After the profile data is collected by the content server 100, it may be stored in a memory device (profile database 410) in step 510. The profile database 410 may be a centrally located database or a distributed database, as discussed above.

After the profile data is stored in a memory device, each user's profile data may be compared with the profile data of different ones of the other users in step 520. This comparison step may involve the comparison of all profile data, or only selected ones of the profile data, depending on the requirements for the formation of the subject affinity group.

Following the comparison step 520, the users that surpass a threshold profile data matching standard with other users may be associated with a particular affinity group in step 530. Even if a user's profile data does not result in the inclusion of the user in a particular affinity group, the user may override the system and self-select herself for inclusion in the group in step 540.

Based upon the inclusion of a user in an affinity group, the content server 100 delivers various types of content to that user in step 550. The content server initiates, and in some instances may mediate, the actions of multiple users to enable interactive communication between members of an affinity group. Each user's portable communications device 200 may present the content distributed to it in accordance with its capabilities. Content can consist of text, still or moving images, sounds, stimulus (such as vibrations), data files, or applications. User interaction occurs in step 560.

Once a profile is created and stored for a user, it may be updated manually by the user, or automatically by the system in step 570. Automatic updating of the profile may occur at periodic intervals or as the result of some action on the part of the user. For example, the user's completion, victory, or defeat, in association with an interactive game may trigger the system to record such action through an updating of the user's profile. This profile update may result in the user being chosen for games of higher, lower, or the same skill level for future interactive games.

Profile updating may also be carried out automatically in response to certain actions of the user. Thus a user who responds more rapidly or readily to one type of content than another may be automatically configured by the content server to receive more of the preferred content and less of the unpreferred.

Depending upon the frequency of user profile updates, the content server 100 can automatically adjust the content and type of information and notifications sent to the user based upon such behavior as being in a certain location, having attained a certain level defined by the group, having installed a certain application or paid for a certain service, having entered a special code, being in a certain application state on their device, or other behaviors.

Figure 6:
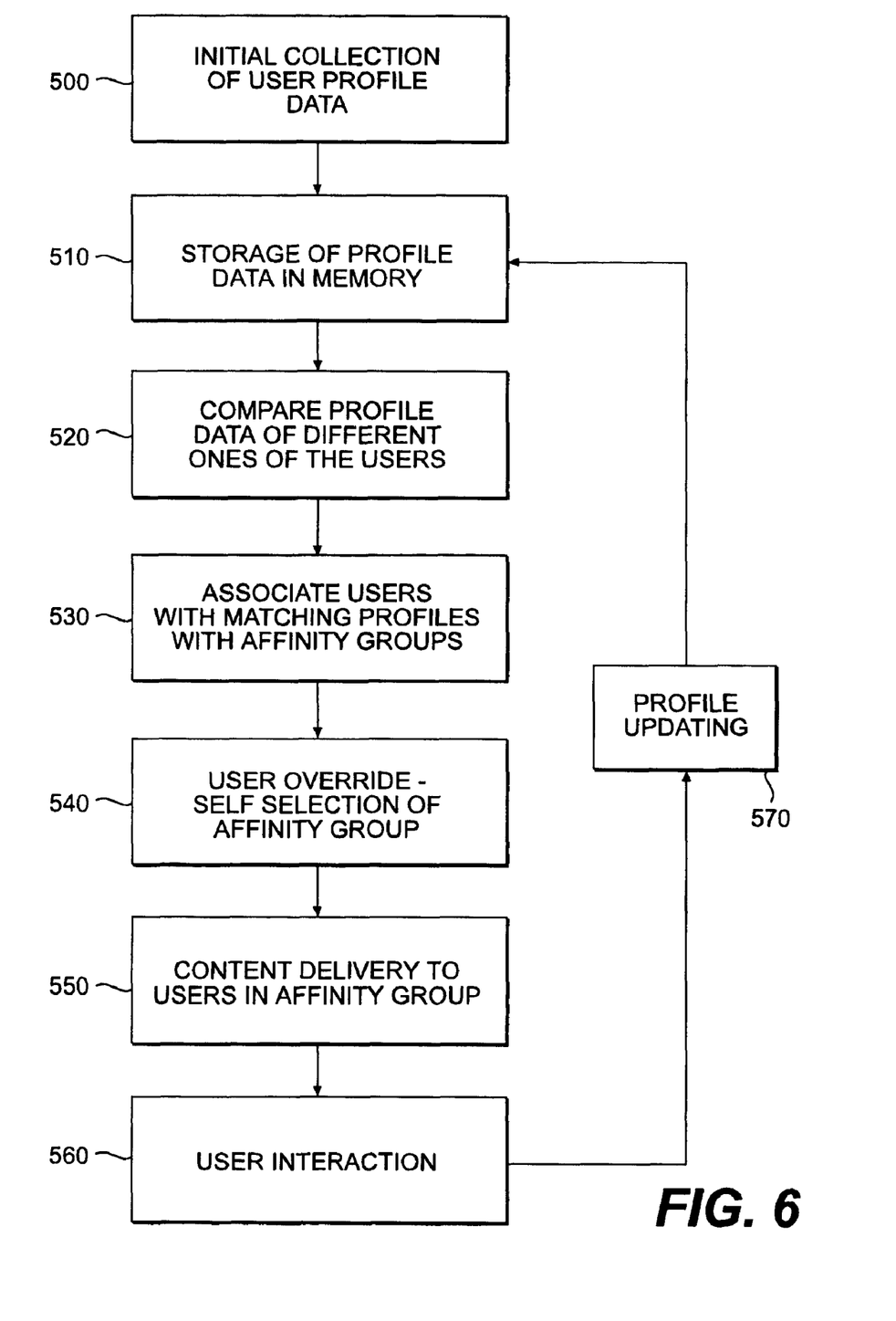
FIG. 6 is a flow chart illustrating the process steps of a method in accordance with a sixth embodiment of the invention.
Figure 7:
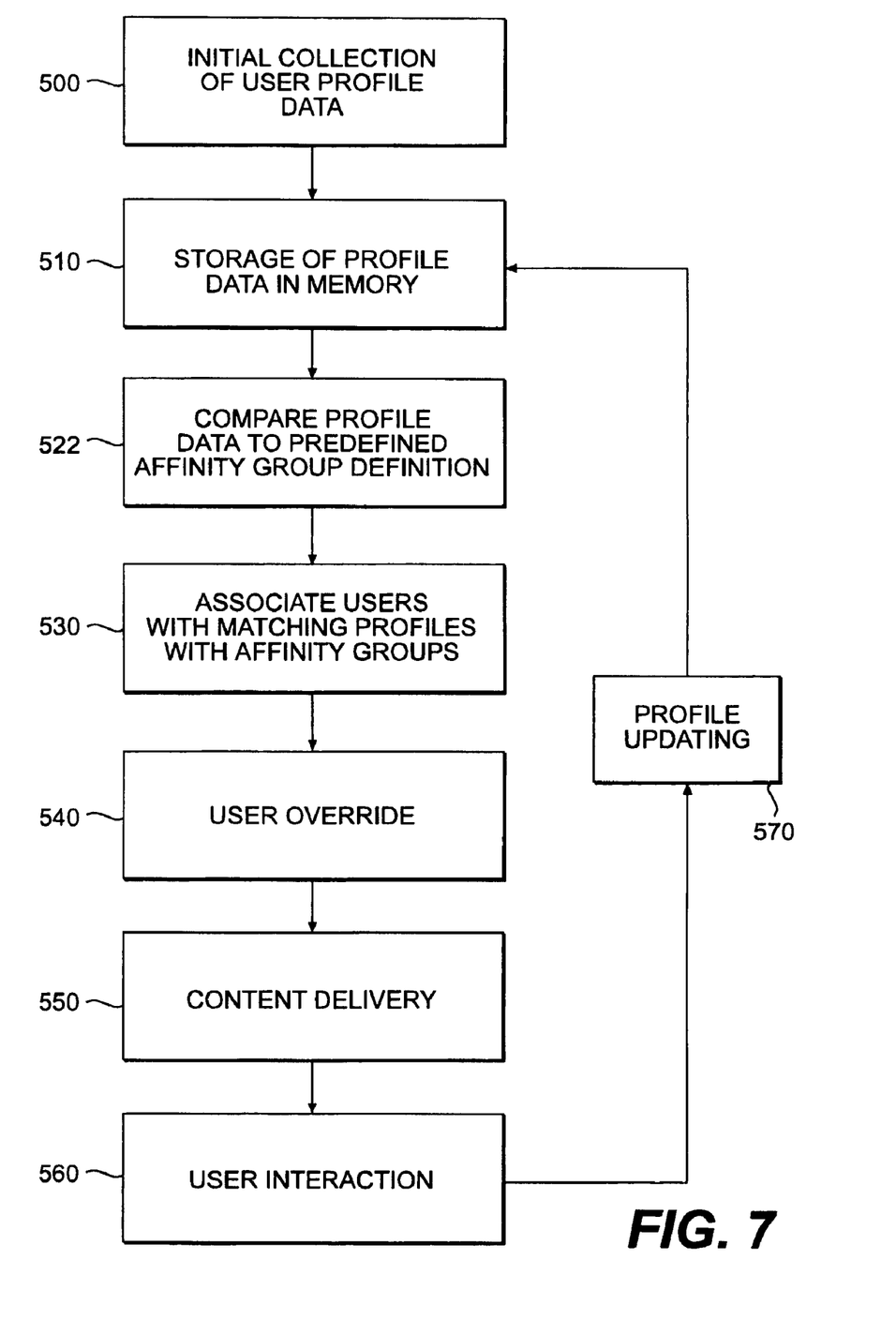
FIG. 7 is a flow chart illustrating the process steps of a method in accordance with a seventh embodiment of the invention.

A method similar to that described in connection with FIG. 6, is shown in FIG. 7. The difference between the methods of FIGS. 6 and 7 being only that in FIG. 7 the user profile data is compared with a predefined affinity group definition or template in order to determine which users should be included in the affinity group.

An example of a specific implementation of an embodiment of the invention follows. A user interested in playing a game of chess at a particular time over a wireless communications network would have a profile on his or her portable communications device that describes the user's chess ranking, the display capabilities of the device, other network-specific attributes, and other criteria particular to the user (Steps 500 and 510). Upon wishing to initiate a game, the user would query the central content server to locate other potential players also currently waiting to play which fit in that user's bracket. The content server may then carry out the necessary comparisons to form an affinity group for the game (Steps 520 and 530). After returning a response to both users and performing some other mediation tasks, the content server will be inactive until the game is completed (Steps 550 and 560). At the completion of the game, each user's local profile is updated accordingly with the game's results, and the content server is notified by the users that the game is over (Step 570).

It will be apparent to persons of ordinary skill in the art that various modifications and variations may be made in the system and method of the embodiments of the present invention discussed above without departing from the intended scope of the invention. For example, the invention is not limited to implementation using any particular devices to perform the functions of the wireless network 300, the content selector 100, the portable communications devices 200, and the profile database 410. The reference to known devices and systems to perform the functions of these elements is intended to be exemplary only, and not to limit the scope of the invention.

Applicants also anticipate that the system and method of a preferred embodiment of the present invention are fully compatible and usable in conjunction with PC based games, as well as Internet applications, and TV-based games. In addition, Applicants anticipate that the service employing the systems and methods of the present invention may be offered as a flat rate offering in conjunction with services such as Assignee=s CricketK wireless communications service. Such services may be offered on a prepaid billing service for game purchase. In addition, scores may be posted through the wireless network in a number of locations.

Numerous other variations and modification will be apparent to persons of ordinary skill that will facilitate the delivery of wireless interactive applications, at a high level of graphic quality, while more efficiently using network bandwidth and resources than prior known systems and methods. Thus, it is intended that the present invention include variations and modifications in the selection and arrangement of these devices, provided they come within the scope of the appended claims and their equivalents.

What is claimed is:

1. A method of creating an affinity group of portable communications device users, the method comprising: providing wireless communication between said users; receiving profile data relating to each of said users; storing the profile data relating to each of said users; comparing, using a processor, the stored profile data of different ones of said users; associating, using a processor, users with the affinity group based on the profile data comparison; excluding a user from the affinity group based on the profile data comparison; receiving input from the excluded user overriding the exclusion; and associating, based on the received input, the requesting excluded user with the affinity group.

2. The method of claim 1 wherein the profile data comprises information selected from the group consisting of: user news preferences, user sports preferences, user advertisement preferences, user purchase preferences, user electronic game preferences, user interactive game preferences, user game skill level, user virtual reality character characteristics, user portable communications device capabilities, user portable communications device model, user portable communications device usage level, user occupation, user income level, user education level, user residence, user sex, user religion, and user frequent location.

3. The method of claim 1 wherein the profile data comprises information selected from the group consisting of user electronic game preferences, user interactive game preferences, user game skill level, user virtual reality character characteristics, and user portable communications device capabilities.

4. The method of claim 1 wherein the profile data includes user electronic game preferences.

5. The method of claim 1 wherein the profile data includes user interactive game preferences.

6. The method of claim 5 wherein the interactive game preferences comprise information selected from the group consisting of: user individual game selection history, user game genre selection history, and user ranking of interest in games.

7. The method of claim 1 wherein the profile data includes user game skill level.

8. The method of claim 1 wherein the profile data includes user virtual reality character characteristics.

9. The method of claim 1 wherein the profile data includes user interactive game preferences and user game skill level.

10. The method of claim 1 wherein the provision of wireless communication involves the use of plural portable communications devices, each said portable communications device having a memory device located therein, and wherein the profile data is stored in the memory devices located in the portable communications devices.

11. The method of claim 1 wherein the provision of wireless communication involves the use of a centrally located server having an associated memory device, and wherein said profile data is stored in said memory device.

12. The method of claim 1 further comprising:
receiving updated profile data relating to said users;
modifying the stored user profile data based on the received updated profile data;
comparing the modified user profile data of different ones of said users; and
modifying as needed the users associated with the affinity group based on the modified user profile comparison.

13. A method of creating an affinity group of portable communications device users, the method comprising: providing wireless communication between said users; receiving profile data relating to each of said users; storing the profile data relating to each of said users; comparing, using a processor, the profile data of a plurality of said users with a predefined affinity group definition; associating, using a processor, users with the affinity group based on the comparison of the user profile data with the predefined affinity group definition to thereby create the group; excluding a user from the affinity group based on the comparison of the user profile data with the predefined affinity group definition; receiving input from the excluded user overriding the exclusion; and associating, based on the received input, the excluded user with the affinity group.

14. The method of claim 13 wherein the profile data comprises information selected from the group consisting of: user news preferences, user sports preferences, user advertisement preferences, user purchase preferences, user electronic game preferences, user interactive game preferences, user game skill level, user virtual reality character characteristics, user portable communications device capabilities, user portable communications device model, user portable communications device usage level, user occupation, user income level, user education level, user residence, user sex, user religion, and user frequent location.

15. The method of claim 13 wherein the profile data comprises information selected from the group consisting of user electronic game preferences, user interactive game preferences, user game skill level, user virtual reality character characteristics, and user portable communications device capabilities.

16. The method of claim 13 wherein the profile data includes user electronic game preferences.

17. The method of claim 13 wherein the profile data includes user interactive game preferences.

18. The method of claim 17 wherein the interactive game preferences comprise information selected from the group consisting of: user individual game selection history, user game genre selection history, and user ranking of interest in games.

19. The method of claim 13 wherein the profile data includes user game skill level.

20. The method of claim 13 wherein the profile data includes user virtual reality character characteristics.

21. The method of claim 13 wherein the profile data includes user interactive game preferences and user game skill level.

22. The method of claim 13 wherein the provision of wireless communication involves the use of plural mobile portable communications devices, each said portable communications device having a memory device located therein, and wherein the profile data is stored in the memory devices located in the portable communications devices.

23. The method of claim 13 wherein the provision of wireless communication involves the use of a centrally located server having an associated memory device, and wherein said profile data is stored in said memory device.

24. The method of claim 13 further comprising:
receiving updated profile data relating to said users;
modifying the stored user profile data based on the received updated profile data;
comparing the modified user profile data of a user with the predefined affinity group definition; and
modifying as needed the users associated with the affinity group based on the comparison of the modified user profile data with the predefined affinity group definition.

25. A method of maintaining a group of portable communications device users associated with an affinity group based on comparisons of stored user profile data, the method comprising: receiving updated profile data relating to users; modifying, using a processor, the stored user profile data based on the received updated profile data; comparing, using a processor, the modified user profile data of different ones of said users; excluding a user from the affinity group based on the modified user profile comparison; and receiving input from the excluded user overriding the exclusion.

26. A system for distributing content to an affinity group of portable communications device users comprising:

- means for providing portable communications device communication between said users;
- means for storing profile data relating to each of said users, said means for storing being operatively connected to the means for providing communication;
- means for (a) comparing the profile data of different ones of said users, and (b) associating users with the affinity group based on the profile data comparison to thereby create the group, said means for comparing and associating being operatively connected to the means for storing;
- means for receiving input from a portable communications device user excluded from the affinity group based on the comparing, the input overriding the exclusion;
- means for associating the excluded portable communications device user with the affinity group in response to the input overriding the exclusion; and
- means for selecting content for and distributing content to users based on their association with the affinity group, said means for selecting and distributing being operatively connected to the means for providing communication and the means for comparing and associating.

27. The system of claim 26 wherein the profile data comprises information selected from the group consisting of: user news preferences, user sports preferences, user advertisement preferences, user purchase preferences, user electronic game preferences, user interactive game preferences, user game skill level, user virtual reality character characteristics, user portable communications device capabilities, user portable communications device model, user portable communications device usage level, user occupation, user income level, user education level, user residence, user sex, user religion, and user frequent location.

28. The system of claim 26 wherein the profile data comprises information selected from the group consisting of user electronic game preferences, user interactive game preferences, user game skill level, user virtual reality character characteristics, and user portable communications device capabilities.

29. The system of claim 26 wherein the profile data includes user electronic game preferences.

30. The system of claim 26 wherein the profile data includes user interactive game preferences.

31. The system of claim 30 wherein the interactive game preferences comprise information selected from the group consisting of: user individual game selection history, user game genre selection history, and user ranking of interest in games.

32. The system of claim 26 wherein the profile data includes user game skill level.

33. The system of claim 26 wherein the profile data includes user interactive game preferences and user game skill level.

34. The system of claim 26 wherein the means for providing communication includes plural portable communications devices, and wherein the means for storing profile data comprises a memory device located in each portable communications device.

35. The system of claim 26 wherein the means for providing communication includes a centrally located server, and wherein the means for storing profile data comprises a memory device associated with the centrally located server.

36. A system for distributing content to an affinity group of portable communications device users comprising:

- means for providing communication between said users;
- means for storing profile data relating to each of said users, said means for storing being operatively connected to the means for providing communication;
- means for (a) comparing the profile data of each of said users with a predefined affinity group definition, and (b) associating users with the affinity group based on the comparison of user profile data with the predefined affinity group definition to thereby create the group, said means for comparing and associating being operatively connected to the means for storing;
- means for receiving input from a portable communications device user excluded from the affinity group based on the comparing, the input overriding the exclusion;
- means for associating the excluded portable communications device user with the affinity group in response to the input overriding the exclusion; and
- means for selecting content for and distributing content to users based on their association with the affinity group, said means for selecting and distributing being operatively connected to the means for providing communication and the means for comparing and associating.

37. The system of claim 36 wherein the profile data comprises information selected from the group consisting of: user news preferences, user sports preferences, user advertisement preferences, user purchase preferences, user electronic game preferences, user interactive game preferences, user game skill level, user virtual reality character characteristics, user portable communications device capabilities, user portable communications device model, user portable communications device usage level, user occupation, user income level, user education level, user residence, user sex, user religion, and user frequent location.

38. The system of claim 36 wherein the profile data comprises information selected from the group consisting of user electronic game preferences, user interactive game preferences, user game skill level, user virtual reality character characteristics, and user portable communications device capabilities.

39. The system of claim 36 wherein the profile data includes user electronic game preferences.

40. The system of claim 36 wherein the profile data includes user interactive game preferences.

41. The system of claim 40 wherein the interactive game preferences comprise information selected from the group consisting of: user individual game selection history, user game genre selection history, and user ranking of interest in games.

42. The system of claim 36 wherein the profile data includes user game skill level.

43. The system of claim 36 wherein the profile data includes user virtual reality character characteristics.

44. The system of claim 36 wherein the profile data includes user interactive game preferences and user game skill level.

45. The system of claim 36 wherein the means for providing communication includes plural portable communications device, and wherein the means for storing profile data comprises a memory device located in each portable communications device.

46. The system of claim 36 wherein the means for providing communication includes a centrally located server, and wherein the means for storing profile data comprises a memory device associated with the centrally located server.

47. A method of distributing targeted content to an affinity group of portable communications device users, the method comprising: providing wireless communication between a plurality of users; receiving profile data relating to selected ones of said users; storing the profile data relating to said users; comparing, using a processor, the stored profile data of different ones of said users; associating, using a processor, users with the affinity group based on the profile data comparisons; excluding an unmatched user from the affinity group; receiving input from the unmatched user overriding the exclusion; associating the unmatched user with the affinity group; and distributing targeted content to the affinity group.

48. The method of claim 47 wherein the targeted content comprises a game application.

49. A method of distributing targeted content to an affinity group of portable communications device users, the method comprising: providing wireless communication between a plurality of user; receiving profile data relating to selected ones of said users; storing the profile data relating to said users; comparing, using a processor, the profile data of a plurality of said selected users with a predefined affinity group definition; associating, using a processor, users with the affinity group based on the profile data comparisons of the user profile data with the predefined affinity group definition to thereby create the affinity group; excluding an unmatched user from the affinity group; receiving input from the unmatched user overriding the exclusion; associating the unmatched user with the affinity group; and distributing targeted content to said users in the affinity group.

50. The method of claim 49 wherein the targeted content comprises a game application.

51. A system for creating an affinity group, the system comprising:
 a plurality of mobile communications devices;
 a wireless network configured to provide wireless communication between a plurality of mobile communications device users;
 a user profile database configured to store profile data relating to each of the mobile communications device users; and
 a content server including processor electronics configured to perform operations comprising:
  comparing the profile data of different ones of the mobile communications device users;
  associating mobile communications device users with the affinity group based on the profile data comparison to generate the affinity group;
  receiving input from a mobile communications device user excluded from the affinity group based on the comparing, wherein the input overrides the exclusion; and
 associating, in response to the received input, the excluded mobile communications device user with the affinity group.

52. The system of claim 51, wherein the user profile database is configured to store profile data comprising information selected from the group consisting of user news preferences, user sports preferences, user advertisement preferences, user purchase preferences, user electronic game preferences, user interactive game preferences, user game skill level, user virtual reality character characteristics, user portable communications device capabilities, user portable communications device model, user portable communications device usage level, user occupation, user income level, user education level, user residence, user sex, user religion, and user frequent location.

53. The system of claim 51, wherein the user profile database is configured to store profile data comprising information selected from the group consisting of user electronic game preferences, user interactive game preferences, user game skill level, user virtual reality character characteristics, and user portable communications device capabilities.

54. The system of claim 51, wherein the user profile database is configured to store user electronic game preferences.

55. The system of claim 51, wherein the user profile database is configured to store user interactive game preferences.

56. The system of claim 55, wherein the interactive game preferences comprise information selected from the group consisting of user individual game selection history, user game genre selection history, and user ranking of interest in games.

57. The system of claim 51, wherein the user profile database is configured to store profile data including user game skill level.

58. The system of claim 51, wherein the user profile database is configured to store profile data including user virtual reality character characteristics.

59. The system of claim 51, wherein the user profile database is configured to store profile data including user interactive game preferences and user game skill level.

60. The system of claim 51, wherein each of the plurality of mobile communications devices further comprises a memory device configured to store profile data relating to one or more mobile communications device users.

61. The system of claim 51, wherein the user profile database is hosted on a centrally located server.

62. The system of claim 51, wherein the processor electronics are further configured to perform operations comprising:
 receiving updated profile data relating to one or more of the mobile communications device users;
 modifying the stored profile data relating to the one or more mobile communications device users to generated modified profile data;
 comparing the modified profile data with profile data stored in the user profile database; and
 modifying the mobile communications device users associated with the affinity group based on the modified profile data comparison.

63. A system for creating an affinity group, the system comprising:
 a plurality of mobile communications devices;
 a wireless network configured to provide wireless communication between a plurality of mobile communications device users;
 a user profile database configured to store profile data relating to each of the mobile communications device users; and
 a content server including processor electronics configured to perform operations comprising:
  comparing the profile data of a plurality of the mobile communications device users with a predefined affinity group definition;
  associating mobile communications device users with the affinity group based on the comparison of the user profile data with the predefined affinity group definition to thereby create the affinity group;
  receiving input from a mobile communications device user excluded from the affinity group based on the comparing, wherein the input overrides the exclusion; and associating, in response to the received input, the excluded mobile communications device user with the affinity group.

64. The system of claim 63, wherein the user profile database is configured to store profile data comprising information selected from the group consisting of user news preferences, user sports preferences, user advertisement preferences, user purchase preferences, user electronic game preferences, user interactive game preferences, user game skill level, user virtual reality character characteristics, user portable communications device capabilities, user portable communications device model, user portable communications device usage level, user occupation, user income level, user education level, user residence, user sex, user religion, and user frequent location.

65. The system of claim 63, wherein the user profile database is configured to store profile data comprising information selected from the group consisting of user electronic game preferences, user interactive game preferences, user game skill level, user virtual reality character characteristics, and user portable communications device capabilities.

66. The system of claim 63, wherein the user profile database is configured to store user electronic game preferences.

67. The system of claim 63, wherein the user profile database is configured to store user interactive game preferences.

68. The system of claim 67, wherein the interactive game preferences comprise information selected from the group consisting of user individual game selection history, user game genre selection history, and user ranking of interest in games.

69. The system of claim 63, wherein the user profile database is configured to store profile data including user game skill level.

70. The system of claim 63, wherein the user profile database is configured to store profile data including user virtual reality character characteristics.

71. The system of claim 63, wherein the user profile database is configured to store profile data including user interactive game preferences and user game skill level.

72. The system of claim 63, wherein each of the plurality of mobile communications devices further comprises a memory device configured to store profile data relating to one or more mobile communications device users.

73. The system of claim 63, wherein the user profile database is hosted on a centrally located server.

74. The system of claim 63, wherein the processor electronics are further configured to perform operations comprising:
   receiving updated profile data relating to one or more of the mobile communications device users;
   modifying the stored profile data relating to the one or more mobile communications device users to generated modified profile data;
   comparing the modified profile data with the predefined affinity group definition; and
   modifying the mobile communications device users associated with the affinity group based on the comparison of the modified profile data with the predefined affinity group definition.

* * * * *

UNITED STATES PATENT AND TRADEMARK OFFICE
CERTIFICATE OF CORRECTION

| | | |
|---|---|---|
| PATENT NO. | : 7,787,894 B2 | Page 1 of 3 |
| APPLICATION NO. | : 11/400783 | |
| DATED | : August 31, 2010 | |
| INVENTOR(S) | : Daniel Simon, Mark Ford Westling and Phillip Wherry | |

It is certified that error appears in the above-identified patent and that said Letters Patent is hereby corrected as shown below:

The title page showing the illustrative figure should be deleted to be replaced with the attached title page.

In the drawings, Fig. 5, Sheet 3 of 5, please delete "  " and insert -- -- , therefor at both the occurrences.

In the drawings, Fig. 6, Sheet 4 of 5, for Tag "530", Line 3, please delete "GROUPS" and insert -- GROUP --, therefor.

The drawing sheet, consisting of Fig. 7, should be deleted to be replaced with the drawing sheet, consisting of Fig. 7, as shown on the attached page.

Signed and Sealed this
Eleventh Day of October, 2011

David J. Kappos
*Director of the United States Patent and Trademark Office*

United States Patent
Simon et al.

(10) Patent No.: US 7,787,894 B2
(45) Date of Patent: *Aug. 31, 2010

(54) METHOD AND SYSTEM TO FACILITATE INTERACTION BETWEEN AND CONTENT DELIVERY TO USERS OF A WIRELESS COMMUNICATIONS NETWORK

(75) Inventors: Daniel Simon, San Diego, CA (US); Mark Ford Westling, Chevy Chase, MD (US); Phillip Wherry, Vienna, VA (US)

(73) Assignee: Cricket Communications, Inc., San Diego, CA (US)

(*) Notice: Subject to any disclaimer, the term of this patent is extended or adjusted under 35 U.S.C. 154(b) by 537 days.

This patent is subject to a terminal disclaimer.

(21) Appl. No.: 11/400,783

(22) Filed: Apr. 7, 2006

(65) Prior Publication Data
US 2007/0099701 A1    May 3, 2007

(51) Int. Cl.
*H04W 4/00* (2009.01)
*H04B 7/00* (2006.01)

(52) U.S. Cl. .............. 455/466; 455/517; 455/519
(58) Field of Classification Search ............ 463/39, 463/40, 41, 42; 455/466, 456.1, 414.1, 412.1, 455/500, 517–519, 418–420; 725/46, 2, 725/62, 105; 370/312
See application file for complete search history.

(56) References Cited

U.S. PATENT DOCUMENTS

| | | | |
|---|---|---|---|
| 5,618,045 A * | 4/1997 | Kagan et al. | 463/40 |
| 6,205,205 B1 * | 3/2001 | Goldberg et al. | 379/67.1 |
| 6,314,301 B1 * | 11/2001 | Dorenbosch et al. | 455/519 |
| 6,377,793 B1 * | 4/2002 | Jenkins | 455/412.1 |
| 6,524,189 B1 * | 2/2003 | Rautila | 463/40 |
| 6,527,641 B1 * | 3/2003 | Sinclair et al. | 463/39 |
| 6,554,707 B1 * | 4/2003 | Sinclair et al. | 463/39 |
| 6,628,302 B2 * | 9/2003 | White et al. | 715/717 |
| 6,647,257 B2 * | 11/2003 | Owensby | 455/414.1 |
| 6,702,672 B1 * | 3/2004 | Angell et al. | 463/25 |
| 6,712,702 B2 * | 3/2004 | Goldberg et al. | 463/42 |
| 6,893,347 B1 * | 5/2005 | Zilliacus et al. | 463/41 |
| 6,993,325 B1 * | 1/2006 | Waesterlid | 455/414.1 |
| 7,035,653 B2 * | 4/2006 | Simon et al. | 455/466 |
| 7,284,202 B1 * | 10/2007 | Zenith | 715/744 |

* cited by examiner

*Primary Examiner*—George Eng
*Assistant Examiner*—Brandon J Miller
(74) *Attorney, Agent, or Firm*—Perkins Coie LLP (57) ABSTRACT

A system and method of creating affinity groups of portable communication device users, and distributing targeted content to said users is disclosed. The user affinity groups may be formed by comparing user profiles with each other or with a predefined affinity group profile definition.

74 Claims, 5 Drawing Sheets

FIG. 7